United States Patent [19]

Stodt

[11] 4,135,772
[45] Jan. 23, 1979

[54] BEARING BLOCK FOR BORING TURBINE

[75] Inventor: Enno Stodt, Heidenheim, Fed. Rep. of Germany

[73] Assignee: Voith Getriebe KG, Fed. Rep. of Germany

[21] Appl. No.: 821,715

[22] Filed: Aug. 4, 1977

[30] Foreign Application Priority Data

Aug. 11, 1976 [DE] Fed. Rep. of Germany ....... 2636048

[51] Int. Cl.² ............................................ B62B 19/02
[52] U.S. Cl. .................................... 308/227; 175/107
[58] Field of Search ................ 308/8.2, 189, 184, 207, 308/219, 194, 227–231, 158–159, DIG. 13, 174–176, 139, 160, 164, 135, 143, 145; 175/107; 415/DIG. 6, 502

[56] References Cited

U.S. PATENT DOCUMENTS

| 3,449,030 | 6/1969 | Tiraspolsky et a. ................ 308/230 |
| 3,982,797 | 9/1976 | Tschirky et al. ................ 308/219 X |
| 4,029,368 | 6/1977 | Tschirky et al. ...................... 308/8.2 |

Primary Examiner—Galen L. Barefoot
Assistant Examiner—Douglas C. Butler
Attorney, Agent, or Firm—Ostrolenk, Faber, Gerb & Soffen

[57] ABSTRACT

A bearing block for a boring turbine, with ball bearings having intermediate spring rings between them: the spring rings have spring deflection characteristics such that the bearings are stressed in series sequence as the cutting force changes and such that each bearing is not stressed until the previous bearing in series has been stressed; for adjusting the deflection characteristic, some rings have varying size holes through them.

7 Claims, 4 Drawing Figures

U.S. Patent
Jan. 23, 1979
4,135,772
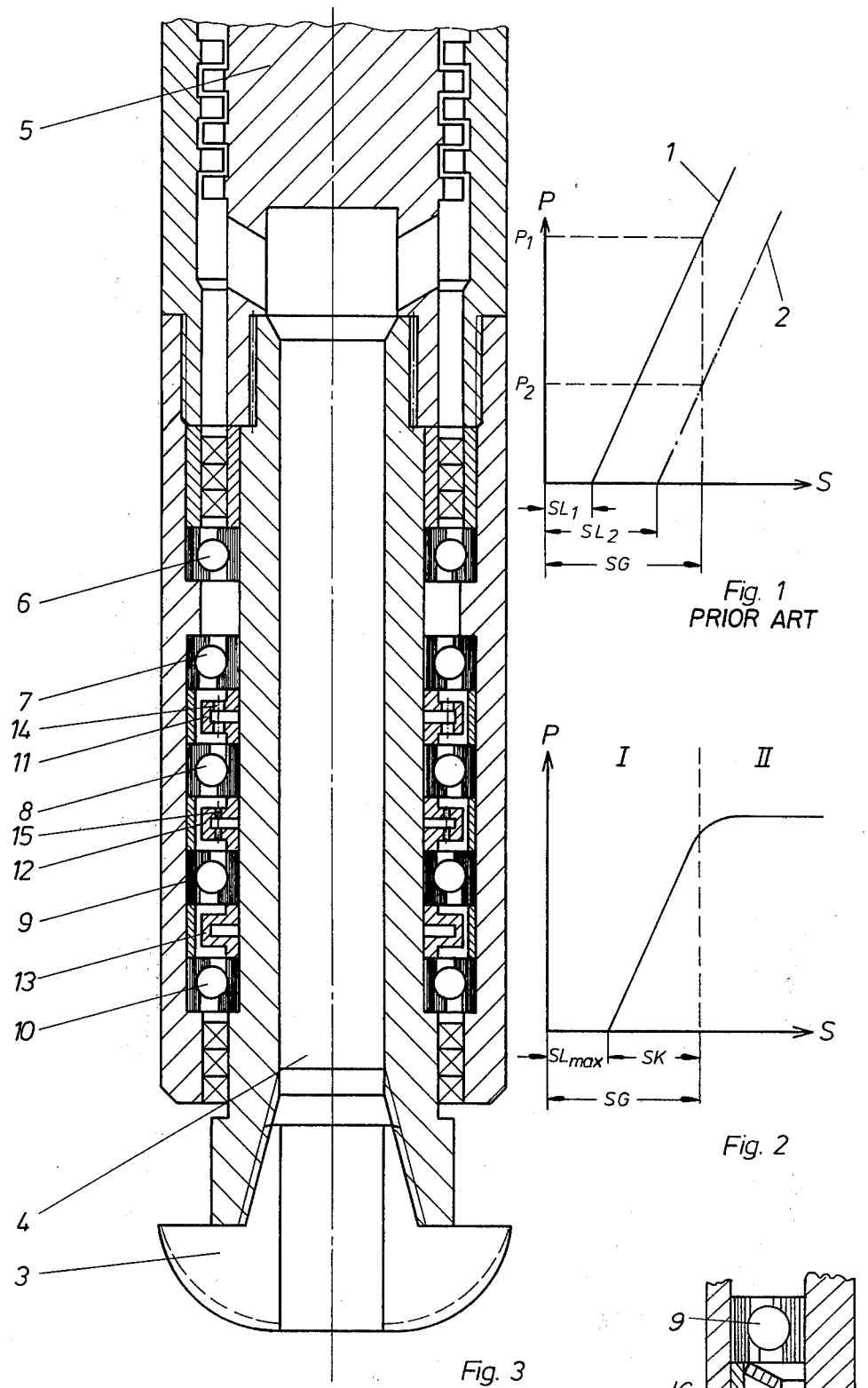
Fig. 1 PRIOR ART
Fig. 2
Fig. 3
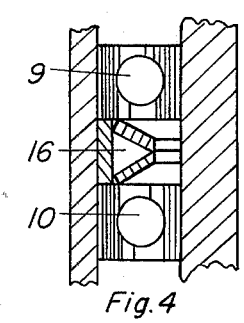
Fig. 4

BEARING BLOCK FOR BORING TURBINE

FIELD OF THE INVENTION

The invention relates to a bearing block for a boring turbine, comprising the turbine bearing and several ball bearings being arranged in a row, one after the other and being separated from each other by flexible spring rings interposed between the bearings.

BACKGROUND OF THE INVENTION

During boring by a boring turbine, the cutting forces produce an axial thrust which cannot be controlled because it depends largely on the operators' manipulations and the nature of the ground. The weight of the turbine rotor and, if applicable, an additional hydraulic axial thrust are absorbed by the turbine bearing. The axial thrust due to the cutting forces is directed in the opposite direction to the thrust due to the weight of the turbine rotor. However, since the axial thrust due to the cutting forces is considerably greater, these forces must be absorbed by several roller or ball bearings, which are arranged adjacent to each other. Several small roller or ball bearings are needed since the space is restricted in the radial direction and does not allow for a single bearing of appropriately large dimensions.

Intermediate spring rings have been arranged between the roller or ball bearings to distribute the load over these bearings. Despite the theoretical uniformity of the working life of these bearings, individual bearings have failed prematurely. The working life of the bearing block was thus reduced considerably, which had an adverse effect on the already high cost of boring.

Uneven loading of the bearings has occurred for the following reason. Intermediate spring rings are normally operated over a characteristic deflection curve range in which the force on the rings also increases with the length of the path of the axial motion of the turbine shaft. This force on each ring is retransmitted to the bearing associated with the intermediate ring. However, different bearing play prevails in the bearings, within their tolerance limits. Thus, before the intermediate spring rings respond to the occurrence of an axial thrust on the shaft of the boring tool, and before they are loaded further when there is corresponding initial stressing, this bearing play in the roller bearings, which is hereafter referred to as the idle path, must be taken up. The idle path is indeterminate within the tolerance limits of the bearing. This results in different loadings for the individual bearings. The intermediate spring rings are normally used during the rising portion or range of the characteristic curve of the rings, after the idle path has been traversed. In the extreme case, when the idle path of a bearing is greater than the total length of the path of axial motion of the boring shaft due to the axial thrust on the shaft, it can even happen that that bearing does not take any load at all. This leads to corresponding overloading of the other bearings.

SUMMARY OF THE INVENTION

It is the object of the invention to achieve a more even distribution of the load on the bearings in a bearing block for a boring turbine and thus to obtain a longer working life for the bearing block.

According to the invention, for equalizing different axial bearing play or idle paths, to avoid uneven loading of bearings and therefore to provide more even distribution of force over the roller or ball bearings, the intermediate spring rings have a spring force characteristic such that the loading of the intermediate spring rings is approximately constant over the entire path of axial motion of the turbine shaft and the force on the bearings is approximately constant over the entire axial length of the motion of the boring tool shaft. The intermediate spring rings are designed such that over their characteristic curve ranges, from the force of the intermediate ring which is associated with the first bearing, as viewed from the boring turbine outwards, to the force of the intermediate ring associated with the last bearing, the force increases in steps as the axially directed force on the turbine shaft becomes greater. Even loading of all of the bearings is achieved, even with different amounts of bearing play and different idle paths, because the force on the different rings and thus on the bearings associated with them is constant.

In addition, it is necessary here for this constant line in the characteristic curve range to be stepped correspondingly higher from the first intermediate ring to the last intermediate ring, so that the bearings are loaded evenly in sequence according to the "residual force" left over from the first bearing. The intermediate spring rings are brought together or compressed in sequence, like a train with several carriages, and the bearings are loaded accordingly in sequence.

In an advantageous form of the invention, the amount of force which causes each intermediate ring to deflect along the axial array of rings rises progressively. The working life of the bearing block increases. This is because a maximum axial thrust of the boring tool shaft, in which all of the bearings are loaded, does not occur all of the time. During lesser axial thrusts, only the first bearing or first few bearings are loaded, while the remaining bearings run idle. Because the first bearings are now less heavily loaded and the remaining bearings are, therefore, forced to come into operation under load earlier, the bearings operate under load more equally.

An advantageous form for the intermediate spring rings comprises their having a U-shaped profile, with the loading of the rings comprising the squeezing together of the arms of the U.

According to the invention, provision is also made for the characteristic curve range for any ring, which has a maximum desired force, to have that maximum force at the yield point of the associated bearing, so that no bearing is stressed beyond its yield point, no matter how much the shaft of the tool is axially stressed. By suitable dimensioning of the intermediate spring rings and possibly by empirical assessment, the part of the spring characteristic range over which increases in the axial length of the boring tool shaft path do not give rise to an increase of force can be sufficiently exactly determined.

One technique according to the invention for causing the intermediate spring rings to exert the correct respective axial forces is for at least some of the intermediate spring rings to be provided with weakening holes through them extending axially along the bearing block, wherein the holes decrease in size and/or number in the direction from the intermediate ring associated with the first bearing toward the last intermediate ring. In this way, although the rings have the same profiles and cross sections, the level of force at which the constant flow of force, i.e. further axial deflection of the tool shaft not further stressing each bearing, is reached is at a different respective level for each bearing.

According to the invention, instead of the intermediate rings having a U-shaped profile, cup springs each having a characteristic curve that includes a section with a constant flow of force can also be used.

BRIEF DESCRIPTION OF THE DRAWINGS

The invention will be explained in greater detail and further characteristics of the invention will become apparent from the following description of the accompanying drawings:

FIG. 1 diagrams the axial load on a intermediate spring ring (ordinate) vs. the axial movement thereof (abscissa) and of an intermediate spring ring of the prior art.

FIG. 2 is the same type of axial load vs. axial movement diagram and it shows the deflection path of an intermediate ring according to the invention.

FIG. 3 is a cross-sectional view through a bearing block according to the invention; and FIG. 4 is a cross-sectional view through a fragment of a bearing block, with an alternate form of spring being illustrated.

DETAILED DESCRIPTION OF THE PRIOR ART

In FIG. 1, the force or load P on sprung intermediate rings of a boring tool shaft, due to the axial thrusts caused by the cutting forces, is shown on the ordinate. The path S of the axial motion of an intermediate spring ring due to movement of the boring tool shaft under the influence of axial thrusts is shown on the abscissa. The characteristic axial load vs. axial motion curve 1 of an intermediate spring ring of the prior art is shown. The total length of the path of the axial movement of the intermediate ring, which results from a specific axial thrust on the boring tool shaft, is designated $S_G$. No axial force is exerted on the intermediate ring, however, until the idle path $S_L$ of the bearing associated with the intermediate ring 1 has been overcome. Thereafter, axial force is applied to the intermediate spring ring.

In FIG. 1 two spring characteristic curves for two different length idle paths $S_{L1}$ and $S_{L2}$ for any one bearing are shown. The spring characteristic curves 1 and 2 are identical. Curve 2 is shown here in a borken line. As can be seen from FIG. 1, with different idle paths $S_{L1}$ and $S_{L2}$ for a bearing, a different force effect occurs on the intermediate ring between two axially neighboring thrust bearings for the total axial length of the boring tool shaft path $S_G$. In an extreme case, i.e. if $S_L \geq S_G$, there will be no force exerted on the intermediate spring ring and, therefore, absolutely no bearing loading will occur on the associated thrust bearing.

DESCRIPTION OF A PREFERRED EMBODIMENT

According to the invention, as shown in FIG. 2, the load on the intermediate spring ring vs. its axial motion is established such that once there has been a predetermined axial thrust over the length of the deflection path $S_G$, thereafter the force or load on the bearing associated with the ring depicted in FIG. 2 remains approximately constant. As shown in FIG. 1, in the prior art, the range I was always involved. According to the invention, the intermediate spring ring is now used in range II. For this it is only necessary to ensure that $S_G \geq S_L$ max + $S_K$. In this case, $S_K$, the path of the intermediate ring up to the range II, is constant.

By designing the intermediate spring rings according to the invention, once there is a specific amount of axial thrust on the boring tool shaft, the force on the intermediate ring between axially neighboring thrust bearings and, therefore, on the associated bearings is constant, irrespective of further increases in axial thrust.

In FIG. 3, a bearing block according to the invention is shown in cross-section. The boring head 3 on the end of the boring shaft 4 is driven from a boring turbine 5 (only shown in part). The weight of the boring turbine 5 and the parts appertaining to it is taken up by a turbine bearing 6. The axial thrust due to the cutting forces is absorbed by an axial series of annular ball bearings 7, 8, 9 and 10. Between neighboring ball bearings 7-10, there are three intermediate rings 11, 12 and 13, each having a generally U-shaped profile in cross-section, with the opening into each U facing radially inwardly. The intermediate ring U arms deflect toward each other.

The intermediate ring 11 has axially extending bores 14 therethrough located at spaced intervals around the circumference of its arms. The intermediate ring 12 has bores 15 therethrough. However, the bores 15 are smaller in diameter and/or fewer in number, compared to the bores 14 on the intermediate ring 11. This makes the yield point, i.e. the point at which further axial thrust will not apply additional force on the ring, of the intermediate ring 12 higher than that of the intermediate ring 11. The intermediate ring 13, which has no bores, has the highest yield point.

To span the different bearing tolerances and therefore the different length idle paths when axial thrusts occur, the distribution of the load onto the individual bearings is effected by the plastically deformable intermediate rings 11-13. In the illustrated assembly, even when it is not axially stressed, only the ball bearing 7 has no play. With strong axial thrusts, the first U-shaped, most flexible intermediate ring 11 is deformed until the ball bearing 8 rests on it. Thereafter, it is stressed no further, i.e. it enters range II in FIG. 2. If the axial thrust increases further, the intermediate ring 12 is next deformed until the ball bearing 9 is seated without play, and so on. When the ball bearing 10 is under pressure with no play, then the additional loading from a further increase in the load can now be taken up only by this last bearing.

If, for the purpose of an example, the value of 30 t is taken as the axial thrust due to cutting forces, then 7.5 t is an equal bearing load for each bearing. The first intermediate ring 11 must therefore reach the yield point and enter range II at 7.5 t. Further loading is therefore no longer possible for the first bearing 7, and the second intermediate ring 12 comes into use, together with the bearing 8. So that the ball bearing 8 is also loaded with 7.5 t, the second intermediate ring 12 must be fully plastically deformed at 15 t. Similarly, the third intermediate ring 13 must be fully plastically deformed at 22.5 t so that the ball bearing 9 is also loaded with 7.5 t.

If the bearings are unloaded again, although a hysteresis arises due to the fact that the yield points in the intermediate rings 11-13 have been exceeded, this does not affect the function adversely. However, a further increase in the working life of the bearings can be achieved if the yield points of the intermediate rings 11-13 are progressively stepped, for example, intermediate ring 11 at 6 t, intermediate ring 12 at 14 t and intermediate ring 13 at 23 t.

With lesser axial thrusts the rear or lower bearings run idle, without any load, and only the first ball bearing 7 and, if required, also the ball bearing 8, take the load on their own. This progressive stepping makes it possible for the rear bearings to come into operation at an earlier time. Their higher loading will be compensated for by their shorter running times. In FIG. 4, the intermediate spring ring 11 between bearings 7 and 8 has been replaced by a known cup spring 16. All other spring rings may be replaced by similar cup springs.

Although a preferred embodiment of this invention has been described, many variations and modifications will now be apparent to those skilled in the art, and it is therefore preferred that the instant invention be limited not by the specific disclosure herein, but only by the appended claims.

What is claimed is:

1. A bearing block for a boring turbine, comprising a block housing with a boring tool shaft passing therethrough and rotatable in said housing; a boring tool on an end of said shaft;
   a plurality of axially spaced apart rotation bearings in an axial array for permitting rotation of said shaft in said housing; a first said bearing at one end of the axial array thereof being connected with said block housing for transmitting force thereto; a second said bearing at the opposite end of the axial array thereof being nearer to said tool and being connected with said shaft for having force transmitted to said second bearing from said shaft;
   a respective intermediate spring ring between axially neighboring said bearings, and a plurality of said rings being provided;
   each said ring being deflectable under force applied by said shaft to said second bearing; each said ring being deflectable under force through a gradually increasing level of force until that said ring reaches a deflection level at which further force on said shaft does not cause further deflection of that said ring and that said ring thereafter permitting a constant flow of force;
   each said ring nearer said tool having a greater resistance to deflection than the said ring next further from said tool; said rings having respective deflection characteristics such that the said rings are deflected in a stepped manner starting with said ring furthest from said tool as the axial force on said shaft increases.

2. The bearing block of claim 1, wherein said intermediate spring rings each have a generally U-shaped profile, in cross-section, and said rings being oriented such that the arms of said U-shaped rings deflect toward and away from each other axially of said shaft.

3. The bearing block of claim 2, wherein at least some said rings have holes passing therethrough in a manner to selectively weaken the said rings with holes, and the number, size and spacing of said holes on each said ring being selected to make a said ring further from said tool more easily deflectable than a ring nearer said tool.

4. The bearing block of claim 3, wherein said holes extend through said rings in a direction axially of said shaft; said holes in said rings nearer said tool are smaller in size than said holes further from said tool.

5. The bearing block of claim 1, wherein said intermediate spring rings are in the form of cup springs.

6. The bearing block of claim 1, wherein said rings have respective deflection levels selected such that a said ring further from said tool reaches that deflection level at which it has a constant flow of force before the said ring next further from said tool attains its respective same deflection level.

7. A bearing block for a boring turbine, comprising a block housing with a boring tool shaft passing therethrough and rotatable in said housing; a boring tool on an end of said shaft;
   a plurality of axially spaced apart rotation bearings in an axial array for permitting rotation of said shaft in said housing;
   a first said bearing in the axial array thereof being connected with said block housing for transmitting force thereto; a second said bearing in the axial array thereof being connected with said shaft for having force transmitted to said second bearing from said shaft;
   a respective intermediate spring ring between axially neighboring said bearings, and a plurality of said rings being provided;
   each said ring being deflectable under force applied by said shaft to said second bearing; each said ring being deflectable under force through a gradually increasing level of force until that said ring reaches a deflection level at which further force on said shaft does not cause further deflection of that said ring and that said ring thereafter permitting a constant flow of force;
   said rings having different respective resistances to deflection and having respective deflection characteristics such that each said ring with a lesser resistance to deflection deflects before a said ring with a greater resistance to a deflection, such that said rings deflect in a stepped manner; each said ring having a respective deflection level selected such that one said ring reaches that deflection level at which it has a constant flow of force before another said ring attains its respective same deflection level, and said rings attaining the respective same deflection levels in sequence.

* * * * *